(«12») United States Patent
Ootsuka et al.

(10) Patent No.: US 10,793,156 B2
(45) Date of Patent: Oct. 6, 2020

(54) VEHICLE CONTROL DEVICE

(71) Applicant: JATCO LTD, Fuji-shi, Shizuoka (JP)

(72) Inventors: Yukifumi Ootsuka, Fuji (JP);
Masayoshi Nakasaki, Fuji (JP);
Yoshimasa Nishihiro, Fuji (JP)

(73) Assignee: Jatco Ltd., Fuji-shi (JP)

( * ) Notice: Subject to any disclaimer, the term of this patent is extended or adjusted under 35 U.S.C. 154(b) by 283 days.

(21) Appl. No.: 15/757,506

(22) PCT Filed: Sep. 27, 2016

(86) PCT No.: PCT/JP2016/078332
§ 371 (c)(1),
(2) Date: Mar. 5, 2018

(87) PCT Pub. No.: WO2017/057304
PCT Pub. Date: Apr. 6, 2017

(65) Prior Publication Data
US 2018/0244272 A1    Aug. 30, 2018

(30) Foreign Application Priority Data

Oct. 2, 2015    (JP) .................................. 2015-196964

(51) Int. Cl.
*B60W 30/18*        (2012.01)
*B60W 10/02*        (2006.01)
(Continued)

(52) U.S. Cl.
CPC .......... *B60W 30/181* (2013.01); *B60W 10/02* (2013.01); *B60W 10/06* (2013.01);
(Continued)

(58) Field of Classification Search
CPC ......... B60W 30/181; B60W 30/18072; B60W 2030/1809; B60W 10/107; B60W 10/06;
(Continued)

(56) References Cited

U.S. PATENT DOCUMENTS

2012/0135840 A1*  5/2012  Tatewaki ............. B60W 10/115
                                                   477/115
2014/0019021 A1   1/2014  Yanagida et al.
(Continued)

FOREIGN PATENT DOCUMENTS

JP     2013-213557 A    10/2013
WO     2012/104993 A1    8/2012
WO     2015/037502 A1    3/2015

*Primary Examiner* — David R Morris
*Assistant Examiner* — Lori Wu
(74) *Attorney, Agent, or Firm* — Global IP Counselors, LLP

(57) ABSTRACT

A vehicle control device is for a vehicle having a drive source, and an automatic transmission connected to the drive source, the automatic transmission having an engagement element for disconnecting/connecting transmission of a driving force and a variator placed further upstream than the engagement element. The vehicle control device includes first and second control units. The first control unit is configured to execute sailing stop control to stop the drive source and to put the automatic transmission into a neutral state when a sailing stop condition is established. The second control unit is configured to start the drive source and to implement downshifting of the variator when a size of a deceleration level is a prescribed value or greater when the sailing stop control is cancelled due to a prescribed sailing stop cancellation condition among sailing stop cancellation conditions being established, and to engage the engagement element after the downshifting.

6 Claims, 5 Drawing Sheets

(51) Int. Cl.
| | |
|---|---|
| *B60W 10/06* | (2006.01) |
| *B60W 10/107* | (2012.01) |
| *F16H 59/48* | (2006.01) |
| *F16H 61/02* | (2006.01) |
| *F16H 63/50* | (2006.01) |
| *F16H 59/50* | (2006.01) |
| *F02D 29/02* | (2006.01) |
| *F16H 61/662* | (2006.01) |
| *F16H 59/36* | (2006.01) |
| *F02D 41/12* | (2006.01) |
| *F16H 59/44* | (2006.01) |
| *F16H 59/54* | (2006.01) |
| *B60W 50/00* | (2006.01) |
| *F16H 59/18* | (2006.01) |
| *F16H 61/00* | (2006.01) |

(52) U.S. Cl.
CPC .... *B60W 10/107* (2013.01); *B60W 30/18072* (2013.01); *F02D 29/02* (2013.01); *F02D 41/123* (2013.01); *F16H 59/36* (2013.01); *F16H 59/44* (2013.01); *F16H 59/48* (2013.01); *F16H 59/50* (2013.01); *F16H 59/54* (2013.01); *F16H 61/02* (2013.01); *F16H 61/662* (2013.01); *F16H 61/66231* (2013.01); *F16H 63/50* (2013.01); *B60W 2030/1809* (2013.01); *B60W 2050/0094* (2013.01); *B60W 2050/0096* (2013.01); *B60W 2520/10* (2013.01); *B60W 2520/105* (2013.01); *B60W 2540/10* (2013.01); *B60W 2540/12* (2013.01); *B60W 2710/021* (2013.01); *B60W 2710/0627* (2013.01); *B60W 2710/1005* (2013.01); *F16H 2059/186* (2013.01); *F16H 2061/0015* (2013.01); *F16H 2061/0096* (2013.01); *Y02T 10/48* (2013.01)

(58) Field of Classification Search
CPC .......... B60W 10/02; B60W 2520/105; B60W 2520/10; B60W 2710/1005; B60W 2710/0627; B60W 2710/021; B60W 2050/0094; B60W 2050/0096; B60W 2540/10; B60W 2540/12; F16H 59/36; F16H 59/54; F16H 59/44; F16H 59/48; F16H 59/50; F16H 2059/186; F16H 61/662; F16H 61/66231; F16H 61/02; F16H 63/50

See application file for complete search history.

(56) References Cited

U.S. PATENT DOCUMENTS

| | | | |
|---|---|---|---|
| 2015/0166064 A1* | 6/2015 | Mitsuyasu | .............. F16H 61/21 701/54 |
| 2016/0207524 A1 | 7/2016 | Miyaishi | |
| 2019/0249768 A1* | 8/2019 | Kishi | ...................... F16H 61/02 |

* cited by examiner

VEHICLE CONTROL DEVICE

CROSS-REFERENCE TO RELATED APPLICATIONS

This is a U.S. national phase application of PCT/JP2016/078332, filed on Sep. 27, 2016, which claims priority to Japanese Patent Application No. 2015-196964, filed on Oct. 2, 2015. The entire disclosure of Japanese Patent Application No. 2015-196964 is hereby incorporated herein by reference.

TECHNICAL FIELD

The present invention relates to a vehicle control device for implementing sailing stop control that sets a transmission to a neutral state under prescribed control conditions, and also stops a drive source.

BACKGROUND ART

In recent years, there has been developed a technique (sailing stop control) that, when prescribed control conditions are established while a vehicle is traveling, is used for both control of a transmission to a neutral state (sailing control) and control to stop a drive source, promoting energy saving (see Japanese Unexamined Patent Publication No. 2013-213557).

The conditions (A) to (D) noted hereafter are included as AND conditions in the control conditions of this sailing stop control.

(A) Forward range is selected.
(B) Vehicle speed is a set vehicle speed or greater (medium to high vehicle speed).
(C) Accelerator is off.
(D) Brake is off.

However, when the vehicle is equipped with a continuously variable transmission, provision is such that before stopping the vehicle, the shift ratio of a variator of the continuously variable transmission is downshifted to the lowest level, and restart is done thereafter.

In such a vehicle, when there is sudden deceleration from sailing stop control and the vehicle reaches a stop, it was found that there are cases when the vehicle cannot downshift to the lowest level before stopping.

The causes of this are analyzed.

With sailing stop control, in a state for which the vehicle speed of the abovementioned condition (B) is a set vehicle speed or greater (medium to high speed), the drive source is stopped, the shift ratio of the variator in the medium to high vehicle speed is at the high side, and the transmission has the forward clutch released and is in neutral.

When a sudden braking operation is performed from sailing stop control, sailing stop control is cancelled, return control is performed that operates the drive source and engages the forward clutch, and after the forward clutch is engaged, the variator shift ratio is downshifted to the lowest level.

Engaging the forward clutch before downshifting the variator is done because it is possible to do rotation synchronization of the forward clutch more quickly than when the shift ratio of the variator is on the high side.

However, when attempting to downshift the variator after engagement of the forward clutch in this way, the vehicle stops before it is possible to downshift to the lowest level of the target shift ratio.

The variator performs changing (shifting) of the shift ratio while rotating, so shifting takes more time the slower the rotational speed, and in particular with transmissions of a configuration for which the forward clutch is arranged at the downstream side of the variator, when the vehicle is stopped in a state with the forward clutch engaged, the variator also stops, and rotation is not possible, so it becomes completely impossible to shift the variator.

Therefore, if the vehicle speed when a sudden braking operation is performed from sailing stop control is high speed, it is possible to complete the shift operation while the variator is rotating at a rotational speed that is a certain level or higher, but if the vehicle speed is medium speed, there are cases when the vehicle stops before the shift operation is completed.

Also, hydraulic pressure is generated by a hydraulic pump driven by the vehicle drive source engine, and when the variator is controlled using this hydraulic pressure, when the vehicle speed decreases and engine rotation decreases, the necessary hydraulic pressure cannot be obtained, and shifting of the variator is difficult.

Therefore, it is necessary to complete downshifting of the variator in a state for which the necessary hydraulic pressure can be obtained.

SUMMARY OF THE INVENTION

The present invention was created considering this kind of problem, and its purpose is, in a vehicle provided with a continuously variable transmission having a variator, to provide a vehicle control device that is able to improve the low return performance for downshifting the shift ratio of the variator to the lowest level before the vehicle stops, even when a braking operation is performed during sailing stop control.

To achieve the abovementioned purpose, the vehicle control device of the present invention is a control device of a vehicle which has: a drive source; and an automatic transmission which has an engagement element for disconnecting/connecting the transmission of the driving force and a variator placed further upstream than the engagement element, and which is connected to the drive source, said vehicle control device having: a first control unit that executes sailing stop control that, when sailing stop conditions are established, stops the drive source and also puts the automatic transmission into a neutral state; and a second control unit that, when a prescribed sailing stop cancellation condition among the sailing stop cancellation conditions is established, and the sailing stop control is cancelled, when the size of the deceleration level of the vehicle is a prescribed value or greater, starts the drive source and implements downshifting of the variator, and engages the engagement element after downshifting is complete.

When the sailing stop control is cancelled, and when the size of the vehicle deceleration level is less than the prescribed value, the second control unit preferably starts the drive source and engages the engagement element, and moves to control of the variator after engaging of the engagement element.

It is preferable that the prescribed value be set to vary according to the travel speed of the vehicle when cancelling the sailing stop control.

Included as AND conditions in the sailing stop conditions are: the selection range of the automatic transmission being the forward range, the traveling speed of the vehicle being a set speed or greater, the accelerator of the vehicle being off, and the brake of the vehicle being off, with the sailing stop cancellation condition being that any of the sailing stop conditions are no longer established, and the prescribed sailing stop cancellation condition being that the brake is on being preferable.

Once starting of the drive source and engagement of the engagement element by the second control unit is completed, normal control is preferably implemented in which the engagement of the engagement element is maintained, output of the drive source is controlled according to the accelerator opening degree of the vehicle, and the shift ratio of the variator is controlled according to a preset shift map.

The drive source is an internal combustion engine, and having a third control unit that implements fuel cut control that stops fuel supply to the internal combustion engine if a fuel cutting condition is established is preferable.

With the present invention, when sailing stop control ends in a state with a high deceleration level of the vehicle due to sudden braking, etc., the drive source restarts, engagement of the engagement element is given priority, and shifting of the variator is completed, so the low return performance of the variator is improved, it is possible to have the shift ratio of the variator reach the lowest level or be as close as possible to the lowest level by the time the vehicle stops, and possible to ensure restart capability of the vehicle.

MODES FOR CARRYING OUT THE INVENTION

Figure 1:
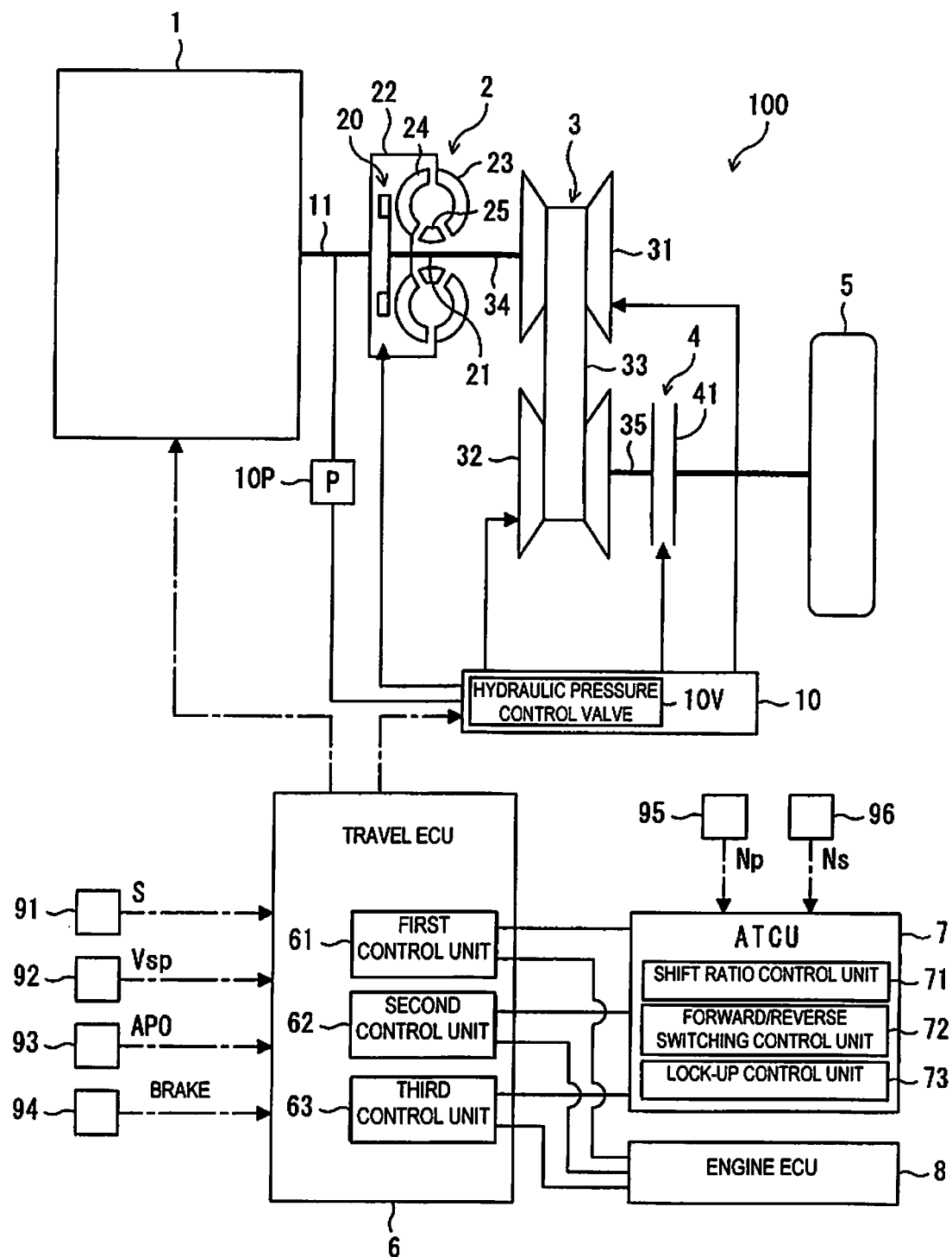
FIG. 1 is a system diagram showing the main parts of the driving system and control system of the vehicle to which the control device of an embodiment of the present invention is applied.

Hereafter, embodiments of the present invention are explained while referring to the drawings. The embodiments shown hereafter are merely examples, and are not intended to exclude application of various changes or technology not shown in the embodiments below. Each configuration of the embodiments hereafter can be implemented with various changes in a range that does not stray from the gist thereof, and it is possible to make choices as necessary, or combine as appropriate.

1. Overall System Configuration

FIG. 1 is an overall system diagram showing the driving system and the control system of the vehicle to which the control device of this embodiment is applied.

As shown in FIG. 1, the driving system of the vehicle is provided with: an engine (internal combustion engine) 1 that is the drive source; a torque converter 2; a variator (continuously variable transmission mechanism) 3; a forward/reverse switching mechanism 4 that has a forward clutch (engagement element) 41; a final deceleration mechanism (not illustrated); a differential (not illustrated); and a drive wheel 5.

By storing the torque converter 2, the variator 3, and the forward/reverse switching mechanism 4 inside a transmission case, a continuously variable transmission (hereafter also called "CVT" or simply "transmission") 100 as an automatic transmission is configured.

A mechanical oil pump 10P driven by the engine 1 is connected to the engine 1, and the oil pump 10P pressurizes the hydraulic oil [ATF (Automatic Transmission Fluid)] according to the rotation of the engine 1, and supplies it to hydraulic equipment of the transmission 100.

The torque converter 2 is a starting element that has a torque increasing function, and has as structural components a pump impeller 23 connected to an engine output shaft 11 via a converter housing 22, a turbine runner 24 connected to a torque converter output shaft 21, and a stator 25 provided in the case with a one way clutch interposed (not illustrated).

The torque converter 2, when the torque increasing function is not needed, has a lock-up clutch 20 that can directly connect the engine output shaft 11 (=torque converter input shaft) and the torque converter output shaft 21.

Though not illustrated, the lock-up clutch 20 operates in response to differential pressure PA-PR between the torque converter apply pressure PA and the torque converter release pressure PR at the input side and output side.

In other words, when the release pressure PR is higher than the apply pressure PA, the lock-up clutch 20 is released, and when the release pressure PR is lower than the apply pressure PA, the lock-up clutch 20 is engaged.

Therefore, by adjusting the release pressure PR and the apply pressure PA, between the input/output elements of the torque converter 20 can be switched between a released state, a completely engaged state (directly connected state), and a slipped engagement state that is intermediate to these.

The variator 3 has a primary pulley 31, a secondary pulley 32, and a belt (or chain) 33 as a power transmitting member, and is provided with a continuously variable transmission function that changes the winding radius to the pulleys 31, 32 of the belt 33 by hydraulic pressure control of the hydraulic oil, and continuously changes the shift ratio (transmission input rotation speed/transmission output rotation speed) which is the ratio of the input rotation speed of the variator input shaft (transmission input shaft) 34 and the output rotation speed of the variator output shaft 35.

With FIG. 1, the torque converter output shaft 21 and the variator input shaft 34 have the same axis, but there are also cases of using a configuration with which the torque converter output shaft 21 and the variator input shaft 34 use different axes, and power connection is done via a gear mechanism, etc.

Though details are not illustrated, the primary pulley 31 is configured by a fixed pulley and a slide pulley, and the slide pulley does sliding movement in the axial direction according to hydraulic pressure (primary pressure or primary pulley pressure) led to the primary hydraulic chamber.

Similarly, the secondary pulley 32 is configured by a fixed pulley and a slide pulley, and the slide pulley does sliding movement in the axial direction according to hydraulic pressure (secondary pressure or secondary pulley pressure) led to the secondary hydraulic chamber.

The sheave surfaces which are each opposing surface of each fixed pulley and slide pulley of the primary pulley 31 and the secondary pulley 32 all form a V shape, and the belt 33 is extended across the V shaped sheave surfaces of the primary pulley 31 and the secondary pulley 32, and power is transmitted by contact with each sheave surface of both end parts of the belt 33.

The winding radius of the belt 33 on the primary pulley 31 and the secondary pulley 32 is changed according to the sliding movement of each slide pulley of the primary pulley 31 and the secondary pulley 32, and the shift ratio is changed.

The forward/reverse switching mechanism 4 is a mechanism for switching between forward and reverse using a planetary gear mechanism (not illustrated), and has a forward clutch (the engagement element for disconnecting/connecting transmission of the driving force of the present invention) 41 for reaching forward levels, and a reverse engagement element (not illustrated) for reaching the reverse level, and each of these friction engagement elements undergoes engagement and release according to the hydraulic pressure supplied and exhausted with each hydraulic chamber.

In the case of this control device, the engagement element can be equipped downstream of the variator 3, and instead of the forward/reverse switching mechanism 4, for example, it is also possible to equip an auxiliary transmission mechanism which is a stepped transmission mechanism with two forward gears and one reverse gear, for example.

In this case, the auxiliary transmission mechanism can be configured, for example, provided with a Ravigneaux planetary gear mechanism with two planetary gear carriers connected, and a plurality of friction engagement elements connected to a plurality of rotation elements that configure the Ravigneaux planetary gear mechanism, and change the linking state thereof.

In regards to this kind of transmission 100, the hydraulic pressure of the primary hydraulic chamber and the secondary hydraulic chamber of the variator 3, the hydraulic chamber of each friction engagement element of the forward/reverse switching mechanism 4 and each hydraulic chamber of the lock-up clutch 20 is controlled through a hydraulic pressure control valve 10V corresponding respectively to each.

Each hydraulic pressure control valve 10V is a solenoid valve equipped inside the hydraulic control unit 10, is operated by command signals from an ATCU 7 as a shift control means described later, and controls pressure regulation of the hydraulic oil supplied from the oil pump 10P and the supply and exhaust to each hydraulic chamber.

2. Control System Configuration

As control means for controlling the vehicle, this vehicle is provided with: a travel ECU 6 as a travel control means that is an electronic control unit for controlling traveling of the vehicle; an ATCU 7 as a shift control means which is an electronic control unit that controls automatic transmission; and an engine ECU 8 as an engine control means that is an electronic control unit that controls the engine 1.

The travel ECU 6, ATCU 7, and engine ECU 8 are all configured provided with an input/output device, a storage device (ROM, RAM, etc.) with many control programs built in, a central processing device (CPU), and a timer counter, etc.

The travel ECU 6 has a function (first control unit) 61 that executes sailing stop control when sailing stop conditions are established, and a function (second control unit) 62 that cancels the sailing stop control and returns to normal traveling when a cancellation condition for this sailing stop control is established.

Furthermore, the travel ECU 6 has a function (third control unit) 63 that executes fuel cut control for stopping fuel supply to the engine 1 when the fuel cutting condition is established.

The return control that cancels the sailing stop control by the first control unit 61 and the sailing stop control by the second control unit 62 and returns to normal traveling is implemented by the control of the transmission 100 through the ATCU 7 and the control of the engine 1 through the engine ECU 8.

Also, the fuel cut control by the third control unit 63 is implemented by the control of the engine 1 through the engine ECU 8.

The ATCU 7 has: a shift ratio control unit (shift ratio control means) 71 that adjusts the hydraulic pressure of each hydraulic chamber of the variator 3 and controls the shift ratio; a forward/reverse switching control unit (forward/reverse switching control means) 72 that adjusts the hydraulic pressure of each hydraulic chamber of the forward/reverse switching mechanism 4 and switches between forward and reverse; and a lock-up clutch control unit (lock-up clutch control means) 73 that adjusts the hydraulic pressure of each hydraulic chamber of the lock-up clutch 20 and switches the engaged state.

The engine ECU 8 controls the fuel supply amount and supply time, the opening degree of the throttle valve, and the ignition timing, etc., of the engine 1.

The sailing stop control does control used for both controlling the transmission 100 to a neutral state (sailing control) and controlling the engine (drive source) 1 to stop, and by doing this, promotes energy saving.

For the sailing stop conditions for performing this sailing stop control, the following conditions (A) to (D) are provided as AND conditions.

(A) Forward range is selected.
(B) Vehicle speed (vehicle traveling speed) Vsp is a set vehicle speed (set speed) Vsp1 or greater (medium to high vehicle speed).
(C) Accelerator is off.
(D) Brake is off.

For this reason, detection information from an inhibitor switch 91 for detecting the selection range of the transmission 100, a vehicle speed sensor 92, an accelerator opening degree sensor 93, and a brake sensor 94 are input to the travel ECU 6, and with the first control unit 61, sailing stop conditions are determined based on detection signals from these sensors.

"Forward range is selected" of condition (A) is determined from whether or not the selection range signal S from the inhibitor switch 91 correlates to the forward range.

"Vehicle speed Vsp is a set vehicle speed Vsp1 or greater" of condition (B) is determined from whether or not the vehicle speed signal Vsp from the vehicle speed sensor 92 is the set vehicle speed Vsp1 or greater.

"Accelerator is off" of condition (C) means the accelerator operation is not implemented, and is determined from whether or not the accelerator opening signal APO from the accelerator opening degree sensor 93 indicates an opening degree of 0.

"Brake is off" of condition (D) means the braking operation is not implemented, and is determined from whether or not the detection signal from the brake sensor 94 indicates that the brake is on.

Having all of the abovementioned sensors that are involved in sailing stop control be normal is a prerequisite, and this prerequisite and having all of the abovementioned conditions (A) to (D) be established is a condition for performing sailing stop control.

With the first control unit 61, as the sailing stop control, the transmission 100 is put to a neutral state, and the engine 1 is stopped. At this time, the shift ratio of the variator 3 is fixed at the highest state or close to the highest state, and the lock-up clutch 20 is released.

Figure 2:
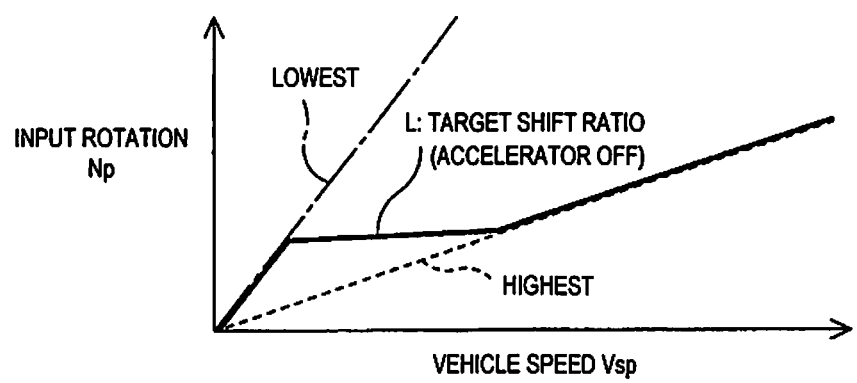
FIG. 2 is a diagram showing a control map using the vehicle control of the embodiment of the present invention.

With normal shift control of the variator 3, when the accelerator is off, the shift ratio is controlled along a target shift line L shown by the solid line in FIG. 2, so if the vehicle speed is a medium to high vehicle speed, the shift ratio is in the highest state or close to the highest state shown by the dotted line.

The sailing stop conditions include condition (B) for which the vehicle speed is medium to high vehicle speed, and condition (C) for which the accelerator is off, so when sailing stop control starts, the shift ratio is in the highest state or close to the highest state of the medium to high vehicle speed in the target shift line L shown in FIG. 2.

During sailing stop control, while the forward clutch 41 is released on the one hand, during return control when the sailing stop control is cancelled and there is a return to normal control, the released forward clutch 41 is engaged, so there is a desire to perform this engagement quickly. As a result, it is possible to make the return to normal control earlier, and possible to improve the vehicle driving performance.

To engage the forward clutch 41, it is necessary to do rotation synchronization between input and output before engaging the forward clutch 41, and it is possible to have the high side of the shift ratio of the variator 3 complete rotation synchronization more quickly, and possible to perform engaging of the forward clutch 41 quickly.

In other words, when returning from sailing stop control to normal control, the engine 1 is started and the forward clutch 41 is engaged, but the output side (drive wheel 5 side) of the forward clutch 41 rotates at a comparatively high speed correlating to the vehicle speed Vsp, and meanwhile, the input side (variator 3 side and engine 1 side) of the forward clutch 41 starts rotating from a stopped state.

If the shift ratio of the variator 3 is at the high side, compared to the primary shaft rotation speed Np (corresponding to engine speed Ne) of the variator 3, the secondary shaft rotation speed Ns (corresponding to the input side rotation speed of the forward clutch 41) of the variator 3 is a higher speed, so the input side rotation of the forward clutch 41 goes to high speed quickly, and it is possible to shorten the synchronization time with the output side of the forward clutch 41.

Also, the cancellation condition of the sailing stop control is that during sailing stop control, any of the sailing stop conditions of the abovementioned conditions (A) to (D) is no longer established.

With the second control unit 62, when any of the sailing stop conditions is no longer established, the cancellation condition for the sailing stop control is regarded as being established, sailing stop control is canceled, and there is a return to normal control.

This second control unit 62, when canceling the sailing stop control, restarts the engine 1 and engages the forward clutch 41, but when the sailing stop control is canceled by the brake being on, shift ratio control of the variator 3 is added to these.

In other words, with the second control unit 62, when the brake is on and the sailing stop cancellation condition is established, command signals are output to the ATCU 7 and the engine ECU 8 so that the engine 1 is started, the forward clutch 41 is engaged, and the shift ratio of the variator 3 is downshifted to the lowest side.

With the shift ratio control unit 71 of the ATCU 7, this downshift is performed by feedback control based on signals relating to the primary pulley rotation speed Np and the secondary pulley rotation speed Ns detected by the primary pulley rotation sensor 95 and the secondary pulley rotation sensor 96.

In this way, downshifting the shift ratio of the variator 3 to the lowest side is provided for when the vehicle is restarted after the vehicle stops due to the brake being on, and is to ensure vehicle start performance by having the shift ratio of the variator 3 be at the lowest level or close to lowest level state.

This kind of return control ends after completion of the start of the engine 1 and the engagement of the forward clutch 41, and thereafter goes to normal control.

When there is sailing stop cancellation due to the brake being on, in addition to the engagement of the forward clutch 41, downshifting of the variator 3 is performed, but with the second control unit 62, during this return control, the two processes of the engagement of the forward clutch 41 and the downshifting of the variator 3 are implemented with priority sequence given based on the size of the deceleration level of the vehicle (scalar quantity of the deceleration level, specifically, the absolute value) d.

In other words, the second control unit 62 gives priority to downshifting of the variator 3 when the size of the vehicle deceleration level (hereafter also simply called deceleration level) d is a preset determination threshold value (prescribed value) $d_V$ or greater, and gives priority to engagement of the forward clutch 41 when the vehicle deceleration level d is less than the determination threshold value $d_V$.

Therefore, when the sailing stop cancellation condition is established, the second control unit 62 outputs command signals to the ATCU 7 and the ECU 8 so as to, when the vehicle deceleration level d is the determination threshold value (prescribed value) $d_V$ or greater, start the engine 1 and implement downshifting of the variator 3, and when downshifting of the variator 3 is completed, engage the forward clutch 41.

Also, when the sailing stop cancelation condition is established, when the vehicle deceleration level d is less than the determination threshold value $d_V$, the second control unit 62 starts the engine 1, implements engagement of the forward clutch 41, and after engagement of the forward clutch 41 is completed, downshifts the variator 3.

In this way, when the vehicle deceleration level d is the determination threshold value $d_V$ or greater, downshifting of the variator 3 has priority, so even if the time until the vehicle decelerates and stops is extremely short, the forward clutch 41 is not engaged, and the variator 3 is not connected to the wheels, so a state for which the variator 3 is rotated by the engine 1 is ensured. As a result, the low return performance of the variator 3 is improved, it is possible to downshift the shift ratio of the variator 3 to the lowest level or close to that, and the vehicle start performance thereafter is ensured.

To change the shift ratio of the variator 3, it is necessary for the variator 3 to be rotating and for the discharge pressure of the oil pump 10P to be ensured at a minimum level or greater. Also, to ensure that the discharge pressure of the oil pump 10P is a minimum level or greater, it is necessary to sufficiently ensure that the rotation speed of the engine 1 is the necessary rotation speed or greater.

Therefore, when the vehicle has stopped, or when the rotation speed of the engine 1 is insufficient and there is not sufficient discharge pressure of the oil pump 10P (in this case, if hydraulic pressure is supplied to the forward clutch 41, there is a further reduction in the supply of hydraulic pressure to the variator 3, and shifting of the variator 3 becomes extremely difficult), it becomes impossible to change the shift ratio of the variator 3.

In light of that, when there is no spare time until the vehicle stops and the rotation speed of the engine 1 decreases to an insufficient state, before the vehicle stops, and while it is possible for the rotation speed of the engine 1 to ensure the discharge pressure of the oil pump 10P at a minimum limit or greater, downshifting of the variator 3 is implemented with priority.

However, when there is time to spare until the vehicle stops or the rotation speed of the engine 1 decreases to an insufficient state, the engagement of the forward clutch 41 has priority, and even if downshifting of the variator 3 starts after engagement of the clutch 41 is completed, it is possible to complete downshifting of the variator 3 until the vehicle stops or until the rotation speed of the engine 1 decreases.

This is because, as described previously, rotation synchronization is necessary between input and output before engaging the forward clutch 41, and it is possible for the high side of the shift ratio of the variator 3 to complete rotation synchronization faster, and possible for the engagement of the forward clutch 41 to be done faster.

Figure 3:
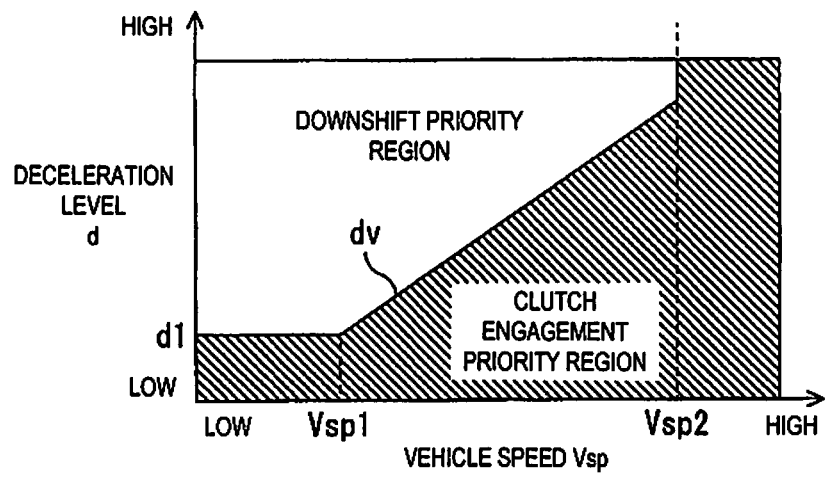
FIG. 3 is a shift chart for explaining the shift ratio characteristics of the variator related to the vehicle control of the embodiment of the present invention.

As shown in the determination map of FIG. 3, the determination threshold value $d_V$ is set to be variable according to the vehicle speed Vsp of the vehicle, and is set with a tendency so that the lower the vehicle speed Vsp, the smaller the determination threshold value $d_V$.

This is because the time until the vehicle stops or the time until the rotation speed of the engine 1 decreases is related not only to the vehicle deceleration level d at the point when the sailing stop cancellation condition is established, but also to the vehicle speed Vsp at that point.

In other words, the time until the vehicle stops or the time until the rotation speed of the engine 1 decreases to an insufficient state depends on the vehicle deceleration level d and the vehicle speed Vsp at the time of deceleration start, and the larger the deceleration level d, the shorter it is, and the lower the vehicle speed Vsp at the time of deceleration start, the shorter it is. In light of that, this is set with a tendency so that the lower the vehicle speed Vsp, the smaller the determination threshold value $d_V$.

With the determination map shown in FIG. 3, in the high speed range for which the vehicle speed Vsp is at a prescribed vehicle speed value Vsp2 or greater, engagement of the forward clutch 41 is set to have priority regardless of the deceleration level d.

This is because in this kind of high speed range of the vehicle, it is sufficient to decelerate while tracing the highest level line in the target shift line L shown by a solid line in FIG. 2, so downshifting of the variator 3 is sufficiently completed even after engagement of the forward clutch 41.

Also, in the medium speed range for which the vehicle speed Vsp is at the prescribed vehicle speed value Vsp2 or less, as long as the deceleration level d is not slow deceleration of a prescribed low deceleration level dl or less, the downshifting of the variator 3 is set to have priority.

This is because with this kind of medium speed range, as shown by the dotted line in FIG. 2, a case is assumed of decelerating while tracing the highest level line skewed from the target shift line L, and as long as the deceleration level d is not slow deceleration of a prescribed low deceleration level dl or less, there is a high risk of not being able to complete downshifting of the variator 3 after engaging of the forward clutch 41.

With normal control, while maintaining the engaged state of the forward clutch 41, the output of the engine 1 is controlled according to the accelerator opening degree APO, and the shift ratio of the variator 3 is controlled according to a preset shift map.

When sailing stop control by the first control unit 61 is implemented, normal control is implemented after going through return control (cancelation of sailing stop control) by the second control unit 62.

As noted previously, return control ends at the stage when the engagement of the forward clutch 41 is completed, so when downshifting of the variator 3 has priority, there is a return to normal control when downshifting of the variator 3 is completed and furthermore, engagement of the forward clutch 41 is completed.

Also, when engagement of the forward clutch 41 has priority, there is a return to normal control if the engagement of the forward clutch 41 is completed, but even when returned to normal control, if the brake on state continues, downshifting of the variator 3 is implemented.

Fuel cut control by the third control unit 63 is control for stopping the fuel supply to the engine 1 and suppressing the fuel consumption amount, and also for strengthening engine braking when the braking operation is performed during traveling by the vehicle at medium to high vehicle speed.

As fuel cutting conditions for performing this fuel cut control, the following conditions (a) to (e) are provided as AND conditions.

(a) Forward range is selected.
(b) Vehicle speed Vsp is the set vehicle speed Vsp2 or greater (medium to high vehicle speed).
(c) The accelerator is off.
(d) The brake is on.
(e) The engine speed Ne is a set recovery rotation speed Ner or greater.

The big differences are that in contrast to having the brake off as one of the conditions with the sailing stop conditions, with the fuel cutting conditions, having the brake on is one condition, and the engine speed condition is added with fuel cutting conditions.

Having the fuel cutting conditions be set to having the brake on is because the purpose is to strengthen engine braking with this fuel cut control.

Also, having the engine speed condition added to the fuel cutting conditions is to avoid the occurrence of stalling of the engine 1 (engine stall) during fuel recovery (restarting fuel injection) from fuel cutting.

With the third control unit 61, based on detections signals from each of the sensors, the fuel cutting conditions of the abovementioned conditions (a) to (e) are determined, and when the fuel cutting conditions are established, fuel cut control is implemented, and when the fuel cutting conditions become not established during fuel cut control, the fuel cut control is ended.

With this fuel cut control, with the transmission 100 in a power transmitting state and with a decrease in the power transmitting loss, fuel supply to the engine 1 is stopped, and the shift ratio of the variator 3 is downshifted to the low side.

To put the transmission 100 in a power transmitting state, it is sufficient for the forward clutch 41 to be engaged, and to decrease the power transmitting loss of the transmission 100, the lock-up clutch 20 can be completely engaged (engagement).

In this way, when the lock-up clutch 20 is completely engaged, there is the risk of engine stall occurring if the engine speed Ne is not high to a certain degree at the time of fuel recovery, and because of that, the engine speed condition (e) was added to the fuel cutting conditions.

This fuel cut control may be started after going through return control from sailing stop control by operating the brake from off to on during sailing stop control.

3. Operation and Effects

Figure 4:
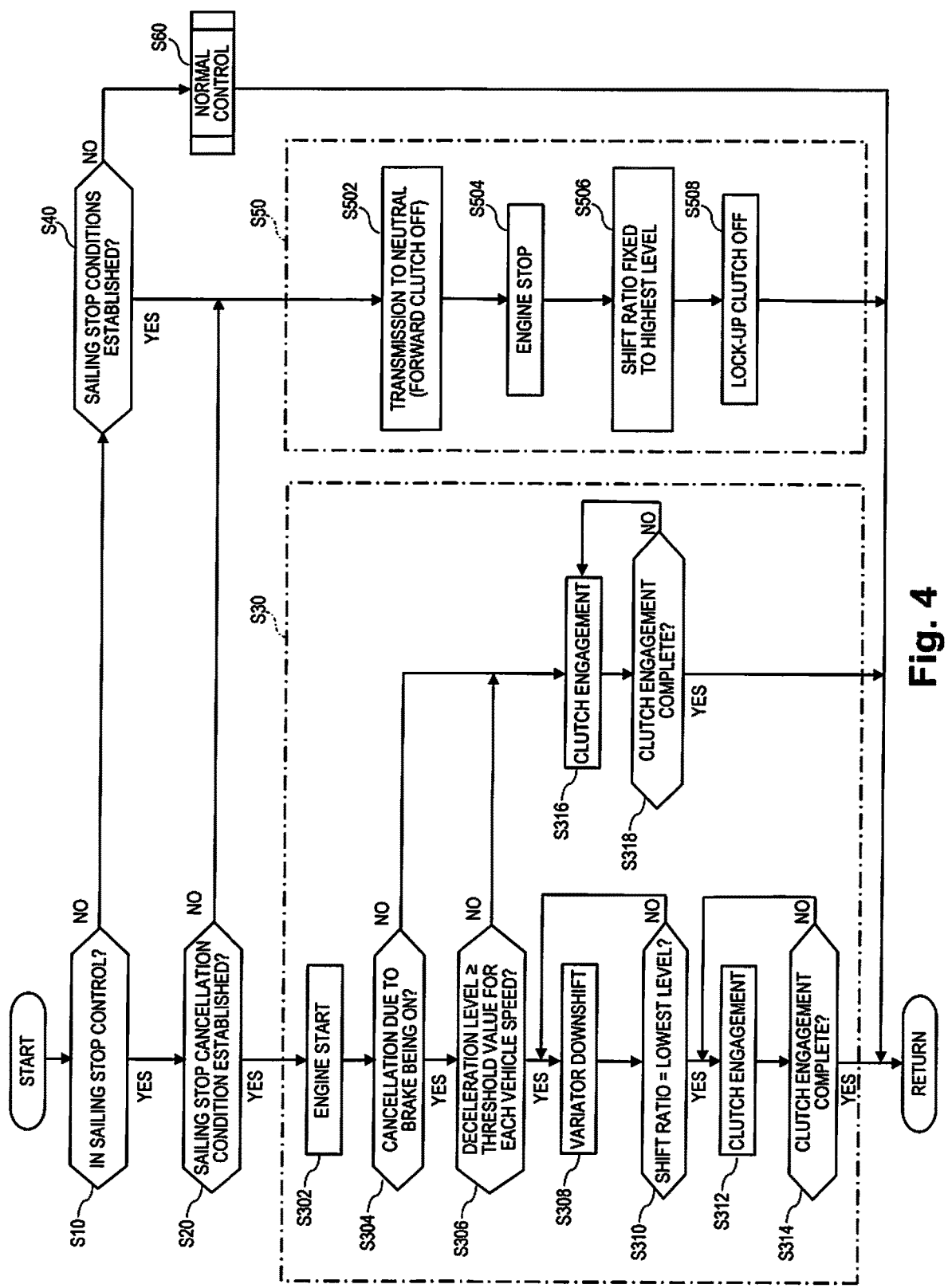
FIG. 4 is a flow chart for explaining the vehicle control of the embodiment of the present invention.

The vehicle control device of an embodiment of the present invention has the configuration described above, so vehicle control is implemented as shown in the flow chart of FIG. 4, for example. With the flow chart in FIG. 4, the vehicle starts by its key being switched on, a prescribed control cycle is repeatedly implemented, and it ends by the key being switched off.

As shown in FIG. 4, first, a determination is made of whether in sailing stop control or not (step S10), and if in sailing stop control, a determination is made of whether sailing stop cancellation conditions are established (step S20), and if not in sailing stop control, a determination is made of whether sailing stop conditions are established (step S40).

For determination of the sailing stop cancellation condition by step S20, a determination is made for the abovementioned conditions (A) to (D), and if any of conditions (A) to (D) is not established, it is determined that the sailing stop cancellation condition is established.

For the determination of sailing stop conditions by step S40, a determination is made regarding the abovementioned conditions (A) to (D), and if all of conditions (A) to (D) are established, it is determined that the sailing stop conditions are established.

When not during sailing stop control, and when it is determined using step S40 that the sailing stop conditions are not established, normal control (step S60) is implemented.

With this normal control, while maintaining the engaged state of the forward clutch 41, the output of the engine 1 is controlled according to the accelerator opening degree APO, and the shift ratio of the variator 3 is controlled according to a preset shift map.

Also, during normal control, during travel of the vehicle at medium to high vehicle speed, when a braking operation is performed and fuel cutting conditions are established, fuel cut control is performed that stops the fuel supply to engine 1, suppressing the fuel consumption amount, and also strengthening engine braking.

On the other hand, when in sailing stop control, when it is determined by step S20 that the sailing stop cancellation condition is established, and when not in sailing stop control, when it is determined by step S40 that sailing stop conditions are established, sailing stop control (step S50) is implemented.

With this sailing stop control, implemented are: control to turn off (release) the forward clutch 41 and put the transmission 100 in the neutral state (step S502), control to stop the engine 1 (step S504), control to fix the shift ratio to highest level (step S506), and control to turn off (release) the lock-up clutch 20 (step S508).

On the other hand, during sailing stop control, when it is determined by step S20 that the sailing stop cancellation condition is established, return control (step S30) is implemented that cancels the sailing stop control and returns to normal traveling.

With this return control, starting of the engine 1 and engaging of the forward clutch 41 are implemented, but prioritization of engagement of the forward clutch 41 and downshifting of the variator 3 is implemented based on the vehicle deceleration level d by the braking operation.

In other words, starting of the return control and also start control of the engine 1 are performed (step S302), a determination is made of whether the sailing stop cancellation condition is established by the brake being on (step S304), and if the sailing stop cancellation condition is established by the brake being on, a determination is made of whether the vehicle deceleration level d is the determination threshold value $d_V$ or greater for each vehicle speed (step S306).

When the sailing stop cancellation condition being established is not by the brake being on, or when the sailing stop cancellation condition being established is due to the brake being on, but the vehicle deceleration level d is less than the threshold value $d_V$, return control back to normal is performed.

This return control to normal gives priority to engagement of the forward clutch 41, so first, engagement control of the forward clutch 41 (step S316) is performed, and then a determination is made of whether engagement of the forward clutch 41 is completed (step S318).

Engagement control of the forward clutch 41 (step S316) is performed until it is determined at step S318 that engagement of the forward clutch 41 is completed. The processes of step S316 and step S318 are performed at prescribed control cycles until it is determined that engagement is complete.

At step S318, when it is determined that engagement is completed, return control ends, and at the next control cycle, via step S10 and step S40, the normal control is implemented (step S60).

When sailing stop cancellation is due to the brake being on, and the brake continues being on, after returning to normal control, downshift control of the variator 3 is implemented.

In contrast to this, when the sailing stop cancellation condition is established by the brake being on, and the vehicle deceleration level d is the threshold value $d_V$ or greater, return control is performed with downshifting of the variator 3 having priority.

With the return control in this case, first, downshift control of the variator 3 is implemented (step S308), downshifting of the variator 3 progresses, and a determination is made of whether the shift ratio is at the lowest level (step S310).

The downshift control of the variator 3 of step S308 is performed until it is determined at step S310 that the shift ratio has reached the lowest level. The process of step S308 and step S310 is performed at prescribed control cycles until it is determined to be the lowest level at step S310.

When a determination of lowest level is made at step S310, the engagement control of the forward clutch 41 is performed (step S312), and a determination is made of whether or not engagement of the forward clutch 41 is completed (step S314). Though not shown in FIG. 4, even before a determination of lowest level is made, even when the accelerator pedal is pressed during downshifting of the variator, the process moves to the clutch engagement process.

The engagement control of the forward clutch 41 of step S312 is performed until it is determined at step S314 that engagement of the forward clutch 41 is complete. The processes of step S312 and step S314 are performed at prescribed control cycles until it is determined that engagement is complete.

When it is determined that engagement of the forward clutch 41 is complete, return control ends, and at the next control cycle, normal control (step S60) is implemented via step S10 and step S40.

Next, referring to the time charts of FIG. 5A to FIG. 7, various examples of return control with this control device are explained. In FIG. 5A to FIG. 7, SS indicates the sailing stop control state, SS return indicates the return control state, stop indicates the vehicle stop state, and FC indicates the fuel cut control state.

Figure 5A:
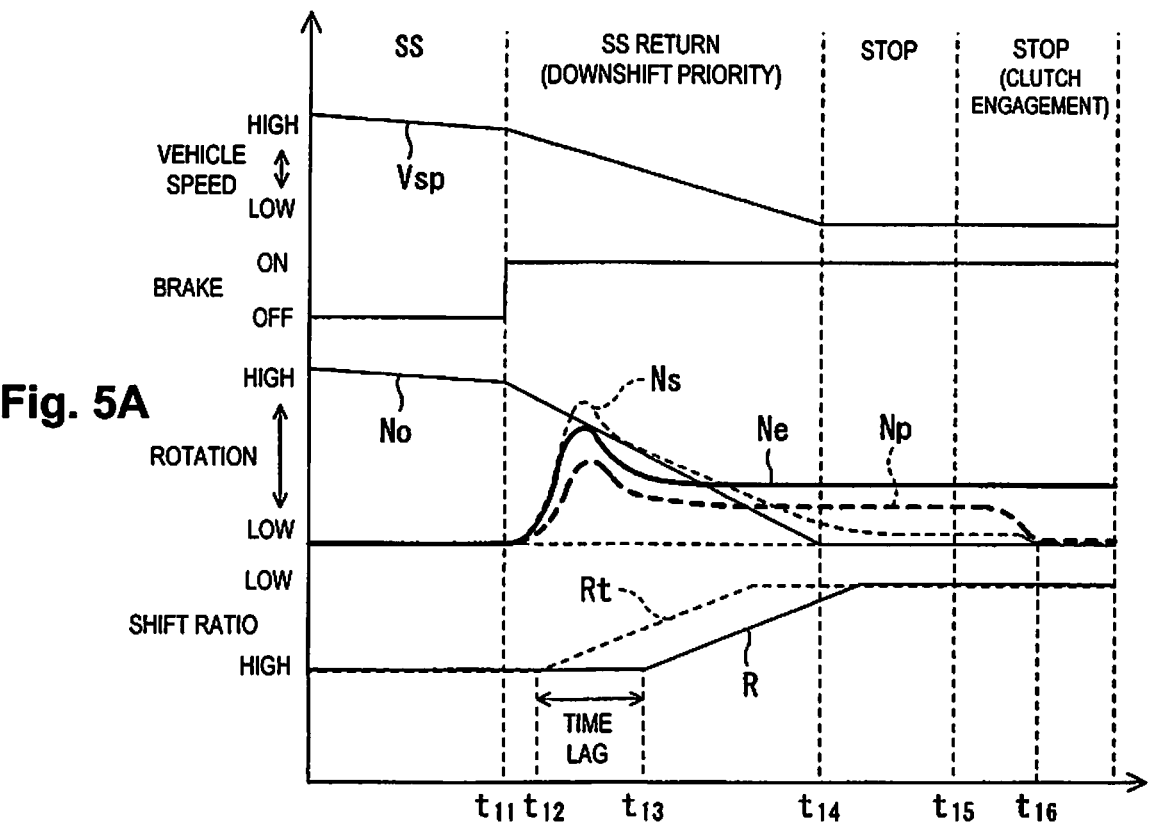
FIGS. 5A and 5B are time charts for explaining the return control (variator downshift priority) of the vehicle control of the embodiment of the present invention.
Figure 5B:
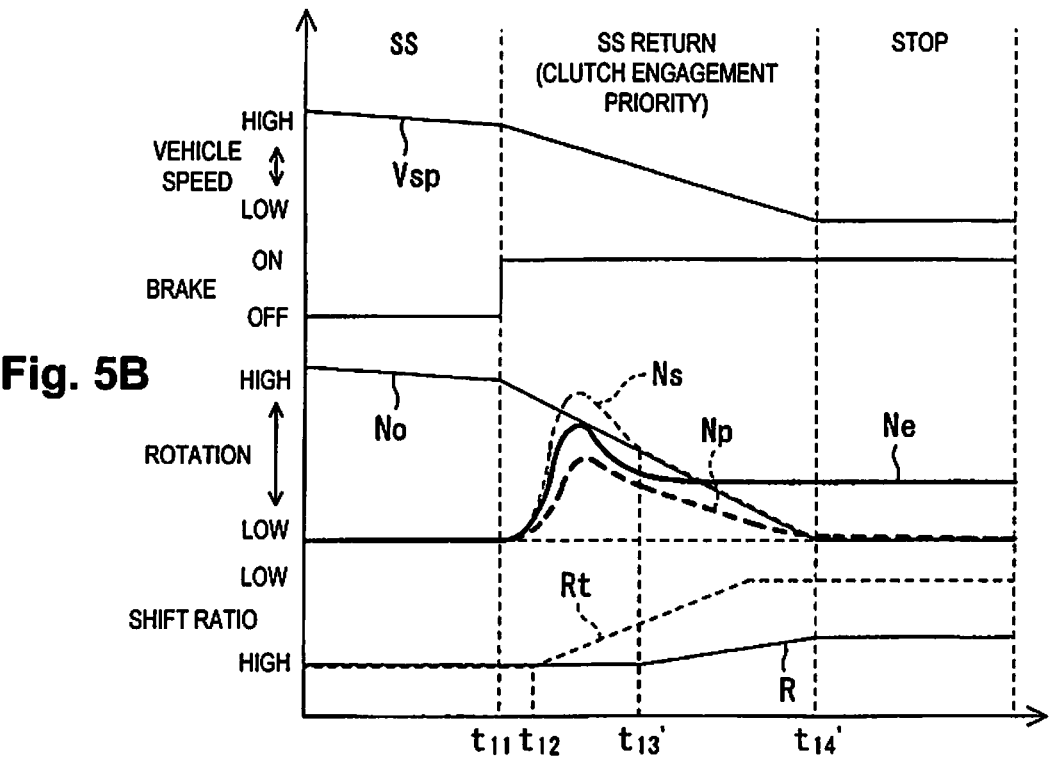

FIGS. 5A and 5B show each variation example of the vehicle speed, brake, each rotation speed, and shift ratio when the sailing stop control cancellation condition is established by the brake being on, and when the vehicle deceleration level d when this condition is established is threshold value $d_V$ or greater. FIG. 5A shows a case when this control is applied, and FIG. 5B shows a case when this control is not applied.

As shown in FIG. 5A, when the braking operation is done at time $t_{11}$ during sailing stop control, the brake is switched from off to on, the sailing stop control cancellation condition is established, and the control for returning from sailing stop control to normal control is started.

Here, the vehicle deceleration level d when the cancellation condition is established is the threshold value $d_V$ or greater, and to perform return control with downshifting of the variator 3 prioritized, the engine 1 start operation is performed immediately after the start of return control, and also the operation of downshifting the target shift ratio Rt to the lowest side is started.

Together with starting of the engine 1, the engine speed Ne rises, and together with that, the primary shaft rotation speed Np of the variator 3 and the secondary shaft rotation speed Ns of the variator 3 rise.

At this time, since the lock-up clutch 20 of the torque converter 2 is released, the primary shaft rotation speed Np is raised so as to follow the engine speed Ne, and the secondary shaft rotation speed Ns is raised so as to be proportional with the primary shaft rotation speed Np with the shift ratio at the start of return control (lowest level or approximately lowest level).

Thereafter, at the time $t_{12}$ at which the engine 1 start is completed, changing to the downshift side of the target shift ratio Rt is started, and the target shift ratio Rt gradually changes toward the lowest level shift ratio.

The actual shift ratio R is also changed to the downshift side from time $t_{13}$ following the target shift ratio Rt, and the secondary shaft rotation speed Ns decreases relative to the primary shaft rotation speed Np.

After starting of the engine 1, until the discharge pressure of the oil pump 10P reaches a state that can be used for control, it is not possible to implement downshifting of the actual shift ratio R, so time lag occurs between the downshift start time $t_{12}$ of the target shift ratio Rt and the downshift start time $t_{13}$ of the actual shift ratio R.

Thereafter, the vehicle stops at time $t_{14}$, and immediately after this vehicle stop, the actual shift ratio R is downshifted to the lowest level, and after that, a command is given to engage the forward clutch 41 at time $t_{15}$.

Even when the vehicle is stopped, the forward clutch 41 is in a released state and the variator 3 is able to rotate, so if the engine 1 is operating, it is possible to ensure the discharge pressure of the oil pump 1op, and possible to engage the forward clutch 41.

By doing this, engagement of the forward clutch 41 is completed at time $t_{16}$, rotation of each of the variator 3 primary shaft, secondary shaft, and transmission output shaft is stopped, and the variator 3 primary shaft rotation speed Np, the variator 3 secondary shaft rotation speed Ns, and the transmission output shaft rotation speed No are all 0.

Therefore, the vehicle stops in a state for which the shift ratio of the variator 3 is at its lowest level. For this reason, it is possible to perform restart of the vehicle in a state with the shift ratio at the lowest level, and possible to ensure good starting performance of the vehicle.

In contrast to this, with the return control performed in the same kind of state as the case shown in FIG. 5A, a command is given to start the engine 1, and when a command is given simultaneously to engage the forward clutch 41 and to downshift the variator 3, the result is as shown in FIG. 5B.

In other words, as shown in FIG. 5B, at time $t_{11}$ during sailing stop control, the braking operation is done (brake goes from off to on), the sailing stop control cancellation condition is established, and return control is started.

The start operation of the engine 1 is performed immediately after return control start time $t_{11}$, and furthermore at time $t_{12}$ at which the engine 1 start completion is determined, an instruction is given to engage the forward clutch 41 and to change the target shift ratio Rt to the downshift side.

The engagement responsiveness of the forward clutch 41 is higher than the downshift responsiveness of the variator 3, so the engagement of the forward clutch 41 is completed at time $t_{13}$' which is earlier than the completion of downshifting, and the variator 3 secondary shaft rotation speed Ns matches the transmission output shaft rotation speed No.

Also, thereafter, downshifting of the variator 3 advances, but at that point in time, in accordance with a sudden deceleration of the vehicle speed, the variator 3 primary shaft rotation speed Np and also the secondary shaft rotation speed Ns decelerate at a very low speed, so it is difficult for downshifting of the variator 3 to advance, and at time $t_{14}$' before downshifting of the variator 3 advances, the vehicle stops in a state with the forward clutch 41 engaged, and the variator 3 also stops.

Therefore, in a state with the downshifting of the variator 3 not advancing, specifically, in a state for which the shift ratio of the variator 3 is not at the lowest level or approaching near the lowest level, the vehicle stops. For this reason, it is necessary to perform restart of the vehicle in a state with the shift ratio at the high side, and there is a decrease in the start performance of the vehicle.

Figure 6:
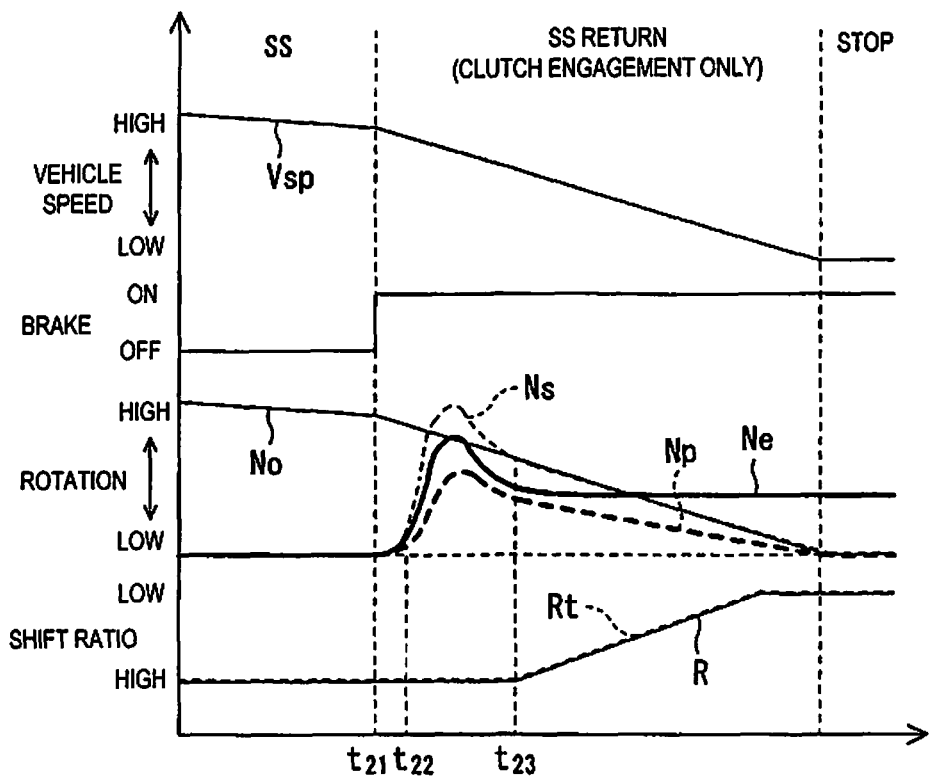
FIG. 6 is a time chart for explaining the return control (forward clutch engagement priority and vehicle stop) of the vehicle control of the embodiment of the present invention.

FIG. 6 shows examples of each change of the vehicle speed, brake, each rotation speed, and shift ratio when at time $t_{21}$, the sailing stop control cancellation condition is established by the brake being on, and the deceleration level d of the vehicle when this condition is established is less than the threshold value $d_V$.

In this case, to perform return control with engagement of the forward clutch 41 having priority, the engine 1 start operation is performed immediately after the return control start time $t_{21}$, and furthermore, at time $t_{22}$ after the engine 1 start completion determination, the operation of engaging the forward clutch 41 starts.

Also, from time $t_{23}$ at which engagement of the forward clutch 41 is completed, the target shift ratio Rt is downshifted to the lowest side.

In this case, even at the time $t_{23}$ when the engagement of the forward clutch 41 is completed, the vehicle speed Vsp is high to a certain degree, and there is some time to spare until the vehicle stops thereafter, so downshifting of the variator 3 is completed before the vehicle stops.

Also, the engagement of the forward clutch 41 is performed in a state with the variator 3 shift ratio at the high side, so it is possible to quickly complete rotation synchronization between input and output before engagement of the forward clutch 41, and possible to quickly engage the forward clutch 41.

In this way, when it is possible to quickly engage the forward clutch 41, when the brake continues to be on even after that, it is possible to complete control in a short time, even including the time until downshifting of the variator 3 shift ratio to the lowest level.

Of course, before the vehicle stops, downshifting of the variator 3 shift ratio to the lowest level is completed, so it is possible to ensure good start performance when doing restart thereafter.

Figure 7:
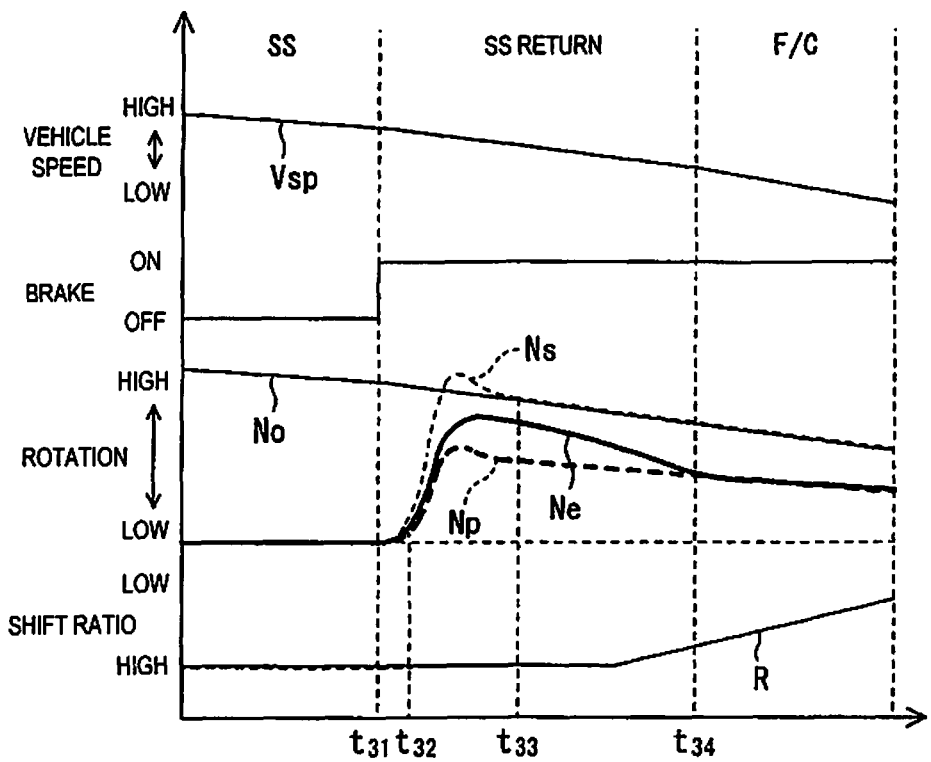
FIG. 7 is a time chart for explaining the return control (forward clutch engagement priority and vehicle travel continuation) of the vehicle control of the embodiment of the present invention.

FIG. 7 shows examples of each variation of the vehicle speed, brake, each rotation speed, and shift ratio when the sailing stop control cancellation condition is established at time $t_{31}$ by the brake being on, and the vehicle deceleration level d when this condition is established is less than the threshold value $d_V$, and when the vehicle speed is higher or the vehicle deceleration level d is smaller than the case in FIG. 6.

In this case, to perform return control with priority for engagement of the forward clutch 41, the engine 1 start operation is performed immediately after return control start time $t_{31}$, and also, the engagement operation of the forward clutch 41 starts at time $t_{32}$ after it is determined that the engine 1 start is complete.

Also, from time $t_{33}$ at which engagement of the forward clutch 41 is completed, the target shift ratio Rt is downshifted to the lowest level side.

In this case as well, even at time $t_{33}$ when engagement of the forward clutch 41 is completed, the vehicle speed Vsp is high to a certain degree, and there is some spa time until the vehicle stops after that, so downshifting of the variator 3 is completed before the vehicle stops.

Also, engagement of the forward clutch 41 is performed with the variator 3 shift ratio in a high side state, so it is possible to quickly complete the rotation synchronization between input and output before engagement of the forward clutch 41, and it is possible to engage the forward clutch 41 quickly.

In this way, when it is possible to engage the forward clutch 41 quickly, it is possible to complete the return control in a short time including the time until downshifting of the variator 3 shift ratio thereafter to the lowest level is completed.

In this case, at time $t_{33}$ when engagement of the forward clutch 41 is completed, the vehicle speed Vsp is sufficiently high, the "vehicle speed Vsp is the set vehicle speed Vsp2 or greater" of condition (b) of the fuel cutting conditions is satisfied, all of fuel cutting conditions (a) to (e) are established, and fuel cut control is implemented.

With this fuel cut control, in a state with the forward clutch 41 engaged and a state with the variator 3 shift ratio near the lowest level, the supply of fuel to the engine 1 is stopped, and engagement of the lock-up clutch 20 is strengthened (engagement at time $t_{34}$). By doing this, the fuel supply to the engine 1 is stopped, the fuel consumption amount is suppressed, and it is possible to strengthen engine braking.

Also, by engaging the forward clutch 41 having priority, it is possible to complete control in a short time, including the time until downshifting of the variator 3 shift ratio to the lowest level is completed, so it is possible to increase the opportunities for this kind of fuel cut control, and possible to promote suppression of the fuel consumption amount.

4. Other

Above, an embodiment of the present invention was explained, but the present invention is not limited to those embodiments, and it is also possible to carry out the invention using a portion of this embodiment or by changing a portion of this embodiment.

For example, it is also conceivable to further add [Condition (E)] for which the variator 3 shift ratio is the highest level as an AND condition to the sailing stop conditions (A) to (D) of the abovementioned embodiment.

In the state with sailing stop conditions (A) to (D) established, in many cases, the variator 3 shift ratio is at the highest level, but with the vehicle speed Vsp in the medium speed range, immediately after the accelerator is switched from on to off, it is assumed that there are cases when the variator 3 shift ratio is not at the highest level (however, it will be close to the highest level).

In this case, when condition (E) is added, when the accelerator is turned off, the shift ratio moves to the highest level, sailing stop control is implemented waiting for this, and it is possible to further suppress the decrease in vehicle speed with the sailing stop control thereafter.

Also, with the abovementioned embodiment, with implementing control with downshifting of the variator 3 by the second control unit 62 having priority as a prerequisite, having the sailing stop cancellation condition established by having the brake on is added (step S304 in FIG. 4), but normally, unless the brake is on, it is thought that the vehicle deceleration level d will not become the threshold value $d_V$ or greater, so the determination of the prerequisite can be omitted.

With the abovementioned embodiments, the engagement element for disconnecting/connecting the transmission of the driving force of the present invention is the forward clutch 41, but as this engagement element, typically, with the forward engagement element as the focus, instead of the forward/reverse switching mechanism 4, for example, it is possible to use a forward engagement element such as an auxiliary transmission mechanism that is a stepped transmission mechanism with two forward gears and one reverse gear, or each engagement element of two forward gears, the first forward gear and the second forward gear.

Also, with the abovementioned embodiment, the control means was configured with hardware from each control unit of the travel ECU 6 as the travel control means, the ATCU 7 as the shift control means, and the engine ECU 8 as the engine control means, but the hardware configuration for these travel control means, shift control means, and engine control means is not limited to this, and for example, it is possible to use various configurations such as providing each function of the travel control means, shift control means, and engine control means inside one control unit, etc.

The invention claimed is:

1. A vehicle control device comprising:
   a first control unit configured to execute sailing stop control to stop a drive source of a vehicle and to put an automatic transmission of the vehicle into a neutral state when a sailing stop condition is established, the automatic transmission being connected to the drive source; and
   a second control unit configured to:
   start the drive source when the sailing stop control is cancelled due to a prescribed sailing stop cancellation condition among sailing stop cancellation conditions being established, the prescribed sailing stop cancellation condition being that a brake of the vehicle is on, implement downshifting of a variator of the automatic transmission when a size of a deceleration level of the vehicle is a prescribed value or greater after the drive source is started, and engage an engagement element of the automatic transmission for disconnecting and connecting transmission of a driving force after the downshifting of the variator is complete, the variator being placed further upstream than the engagement element.

2. The vehicle control device according to claim 1, wherein when the size of the vehicle deceleration level is less than the prescribed value when the sailing stop control is cancelled, the second control unit is configured to start the drive source and to engage the engagement element, and to control of the variator after engaging of the engagement element.

3. The vehicle control device according to claim 1, wherein the prescribed value is set to vary according to a travel speed of the vehicle when the sailing stop control is cancelled.

4. The vehicle control device according to claim 1, wherein once starting of the drive source and engagement of the engagement element by the second control unit is completed, the vehicle control device is configured to implement normal control in which the engagement of the engagement element is maintained, output of the drive source is controlled according to an accelerator opening degree of the vehicle, and a shift ratio of the variator is controlled according to a preset shift map.

5. The vehicle control device according to claim 1, further comprising a third control unit configured to implement fuel cut control that stops fuel supply to an internal combustion engine as the drive source when a fuel cutting condition is established.

6. A vehicle control device comprising:

first control means for executing sailing stop control to stop a drive source of a vehicle and to put an automatic transmission of the vehicle into a neutral state when a sailing stop condition is established, the automatic transmission being connected to the drive source; and second control means for:
- starting the drive source when the sailing stop control is cancelled due to a prescribed sailing stop cancellation condition among sailing stop cancellation conditions being established, the prescribed sailing stop cancellation condition being that a brake of the vehicle is on,
- implementing downshifting of a variator of the automatic transmission when a size of a deceleration level of the vehicle is a prescribed value or greater after the drive source is started, and
- engaging an engagement element of the automatic transmission for disconnecting and connecting transmission of a driving force after the downshifting of the variator is complete, the variator being placed further upstream than the engagement element.

* * * * *